United States Patent [19]
Czernichow

[11] Patent Number: 5,181,565
[45] Date of Patent: Jan. 26, 1993

[54] WELL PROBE ABLE TO BE UNCOUPLED FROM A RIGID COUPLING CONNECTING IT TO THE SURFACE

[75] Inventor: Jean Czernichow, Malabry, France

[73] Assignee: Institut Francais du Petrole, Total Compagnie Francaise des Petroles, Compagnie Generald de Geophysique, Service National Dit: Gaz de France, Societe Nationale Elf Aquitaine (Production), Paris, France

[21] Appl. No.: 631,253

[22] Filed: Dec. 20, 1990

[30] Foreign Application Priority Data

Dec. 20, 1989 [FR] France .................................. 89 17029

[51] Int. Cl.⁵ .............................................. E21B 49/00
[52] U.S. Cl. ........................................ 166/66; 73/152; 166/100; 166/241.2
[58] Field of Search .................. 166/66, 241, 214, 215, 166/100, 65.1, 250; 73/152; 367/25

[56] References Cited

U.S. PATENT DOCUMENTS

| | | | |
|---|---|---|---|
| 3,212,574 | 10/1965 | Fox | 166/100 X |
| 3,500,683 | 3/1970 | Hoyle | 73/152 |
| 3,690,166 | 9/1972 | Grice | 73/152 |
| 4,671,379 | 6/1987 | Kennedy et al. | 367/25 X |
| 4,744,416 | 5/1988 | Bower | 166/66 X |
| 4,775,009 | 10/1988 | Wittrisch et al. | 166/66 X |
| 4,862,425 | 8/1989 | Cretin et al. | 367/33 |
| 4,898,237 | 2/1990 | Wittrisch | 166/241 X |
| 4,901,289 | 2/1990 | Cretin et al. | 367/34 |
| 4,986,350 | 1/1991 | Czernichow | 166/65.1 |

Primary Examiner—Hoang C. Dang
Attorney, Agent, or Firm—Antonelli, Terry Stout & Kraus

[57] ABSTRACT

A well probe including two offset shoes fixed outside of a tubular column and an intermediate shoe provided with a central passage having a cross section larger than a cross section of the column. The intermediate shoe is connected to a lower offset shoe by a mobile hasp. A mobile harness is adapted to be moved into and out of a lateral cavity of the intermediate shoe for enabling coupling and uncoupling of the intermediate shoe with a wall of the well. The mobile harness includes a casing for accommodating sensors and a hydraulic triggering arrangement, with the sensors and the hydraulic triggering arrangement being connected to a surface installation by cables and an electronic cartridge.

13 Claims, 4 Drawing Sheets

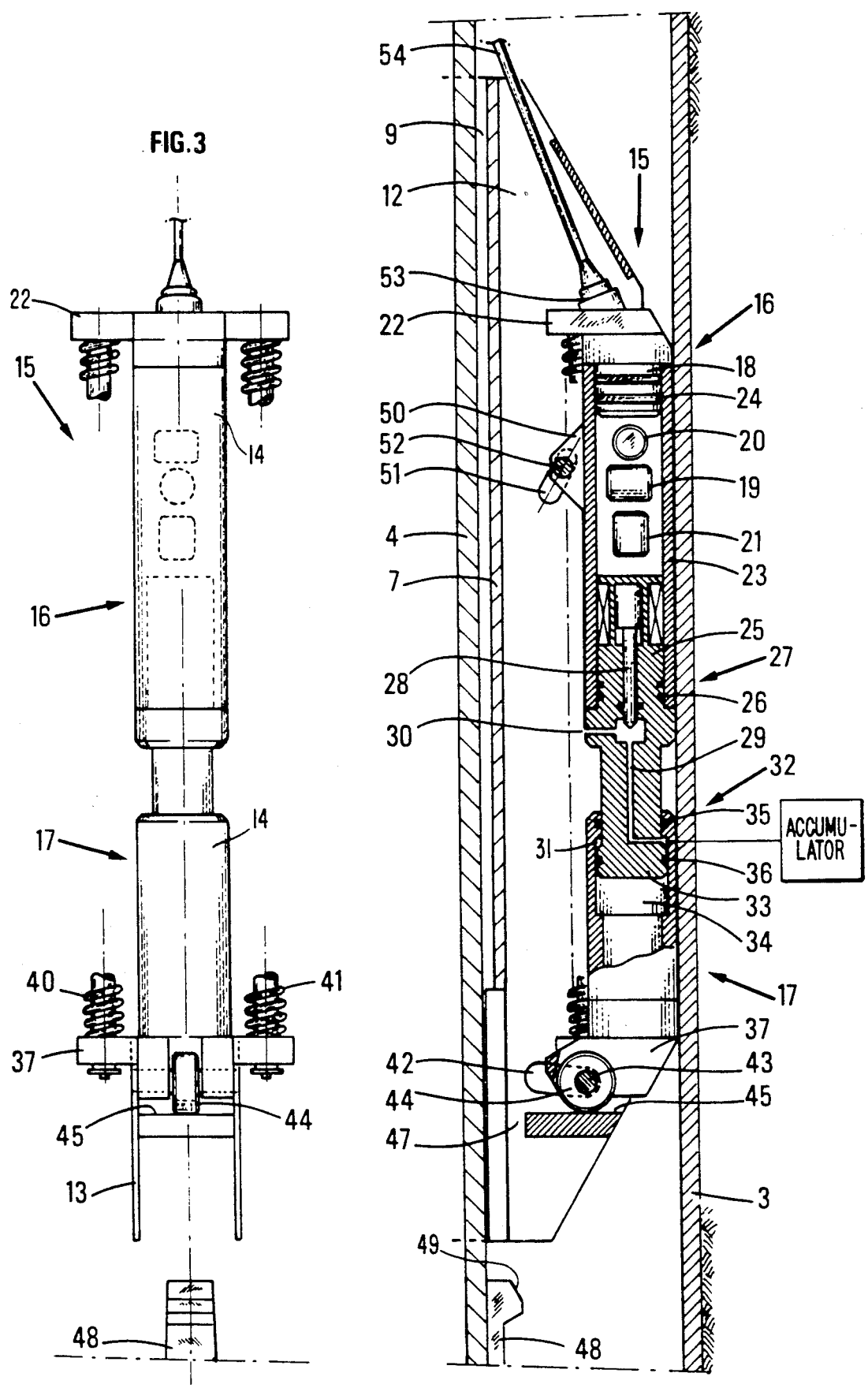

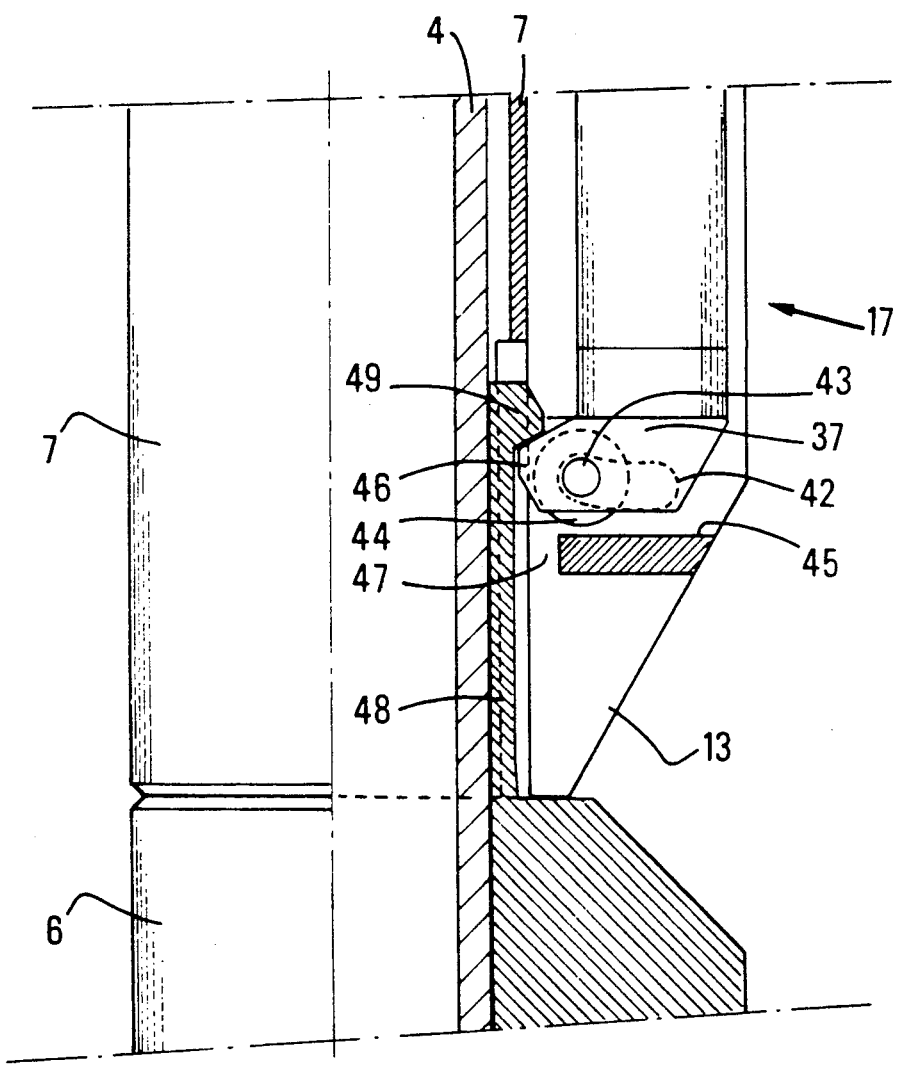

WELL PROBE ABLE TO BE UNCOUPLED FROM A RIGID COUPLING CONNECTING IT TO THE SURFACE

FIELD OF THE INVENTION

The present invention relates to a well probe adapted to be mechanically uncoupled from a rigid link connecting the well probe to a surface installation, with the well probe being associated, for example, with a tubular column of a well for the production of hydrocarbons.

BACKGROUND OF THE INVENTION

Well probes may be associated, for example, with a train of drill and thrust rods as far as inside the extremely steep contorted well sections as part of acoustic or seismic exploration operations.

For example, a well equipped for the production of hydrocarbons comprises a casing string installed during drilling operations. The casing string is held in place with cement injected into the annular space between this casing and the drilling. In the cased well, a tubular column or tubing is installed to allow fluids to flow outside the production zone.

The well probe of the invention makes it possible to install acoustic or seismic sensors in a production well so as to take seismic readings. These type of readings in a reservoir are useful for determining its gradual evolution. For example, a method, known as a vertical seismic profile method (VSP), is used, with this method comprising the receiving of waves sent back by underground reflectors by one or more sensors disposed in one or more well probes lowered along a drilling, with the waves having being emitted by a seismic generator disposed on a surface or even in another well.

The taking of seismic readings in a fitted well requires the installation of a set of sensors and this may only be effected by stopping the production operations. French Patent 2,593,292 (or corresponding U.S. Pat. No. 4,775,009) describes a method and a device for installing a seismic reception unit in a well. The method mainly consists of providing sensors outside the casing and embedding the sensors in cement injected into the annular space. French Patent 2,642,849 (or corresponding U.S. patent application Ser. No. 477,503 now U.S. Pat. No. 4,986,350) also describes a device for anchoring an acoustic or seismic reception unit outside a casing prior to it being cemented in a drilling. The device provides for protection of this control unit against any impacts when installing the casing. Advantageously, such a method and devices make it possible to soundly couple the sensors with the land surrounding the well. On the other hand, coupling of a seismic device by bore hole cementation is irreversible which may sometimes prove to constitute a drawback. More particularly, after bore hole cementation, the installation is definitive in that the reception unit cannot be recovered if the controlled well is less productive than initially anticipated and a defective sensor cannot be changed. Moreover, after the start of an operation, it is sometimes found that certain wells are more particularly promising and that it would be advantageous to install a set of sensors in these already tubed wells.

SUMMARY OF THE INVENTION

The well probe according to the invention makes it possible to overcome the above-mentioned drawbacks. It can be mechanically uncoupled from a rigid linking member connecting it to a surface installation, such as a train of guiding rods in a contorted well or a tubing string enabling fluids to freely circulate. This probe is characterized by at least two offset shoes fixed around the rigid linking member at a certain distance from each other and at least one intermediate shoe disposed around the linking member between the offset shoes. The intermediate shoe is provided with a central passage having a section larger than that of the linking member, and at least one measurement casing is associated with the intermediate shoe. Lateral displacement means couple the measurement casing with the formation surrounding the well, and retractable means secure in translation the intermediate shoe with the linking member. Conductive means connect the measurement casing to a recording unit. The two offset shoes are disposed so that, in their anchoring position, the rigid linking member is centered in the central passage of the intermediate shoe, thus suppressing any direct contact between the intermediate shoe and the linking member.

According to one embodiment, each measuring casing is integral with a movable mobile harness in one lateral cavity of the intermediate shoe between one retracted position and one advanced position, with the mobile harness being made up of two sections mobile with respect to each other in a longitudinal direction and disposed so that a spacing of the two sections along this direction results in a movement of the mobile harness toward the advanced position. Spring means longitudinally space the two mobile sections and releasable means block the spring means in the retracted position of the mobile harness.

On first section of the mobile harness is fitted, for example, with a small wheel resting on one sloping face of the lateral cavity of the intermediate shoe and a second portion comprises an oblique link to guide an axis fixed on the intermediate shoe.

According to one embodiment, the releasable blocking means comprise a piston integral with the first portion of the mobile harness and adapted to be moved into a chamber fitted in the second portion of the mobile harness, and means for controlling the injection of a hydraulic fluid into the chamber so as to compress a spring means.

The means for controlling the fluid injection comprises an electromagnetic valve so as to communicate the chamber with the well.

The means for controlling fluid injection may also comprise an accumulator associated with the probe and containing a pressurized fluid.

According to another embodiment, the mobile harness is provided with a rounded guiding arbor for the axis of the small wheel and oriented so that one traction on the probe, exerted by the rigid linking member, moves the mobile harness to its retracted position.

The retractable means for securing in translation the intermediate shoe comprise, for example, a rigid piece fixed to one offset shoe and means for blocking the rigid piece in the shoe in the retracted position of the mobile harness.

Each measurement casing comprises, for example, cavities for one or several directional seismic or acoustic receivers.

The well probe may comprise an electronic cartridge and the conductive means may comprise a cable element so as to connect each measuring casing to the electronic cartridge, as well as a multi-conductive cable to connect the cartridge to the recording unit.

The rigid linking member may be a tubular column and, in this case, the conductive means are fixed by clips to the outside of this column.

By combining the two offset shoes with one intermediate shoe as defined above, the sensors used are coupled with the wall of the well or the casing thereof, while being mechanically separated from the linl.ing member, such as the tubular column, which connects the probe to the surface. The anchoring force to be applied to the measuring casing is limited due to the fact that the weight of the mechanical pieces associated with it is reduced to that of the intermediate shoe. The mechanical uncoupling obtained by leaving an annular space between the intermediate shoe and the rigid column and by removing the linking means which hold it in place with respect to the lower offset shoe also prevent the sensors from receiving any parasitic vibrations from the column.

BRIEF DESCRIPTION OF THE DRAWINGS

Other features and advantages of the well probe of the invention shall be more readily understood from a reading of the following description of an embodiment of the invention, given by way of a non-restrictive example, with reference to the accompanying drawings, wherein:

FIG. 2 is a schematic partial cutaway view of one portion of the intermediate shoe plane of the measuring casing and showing the mobile harness in a coupling position;

FIG. 3 is a side view of the same portion of the intermediate shoe, with the hasp for linking to the lower offset shoe being in the release position;

FIG. 5 is a partial sectional view of the lower portion of the mobile harness of FIG. 2 in a retracted and engaging position of the hasp which connects it to the lower offset shoe in the engaging position.

DETAILED DESCRIPTION

Figure 1:
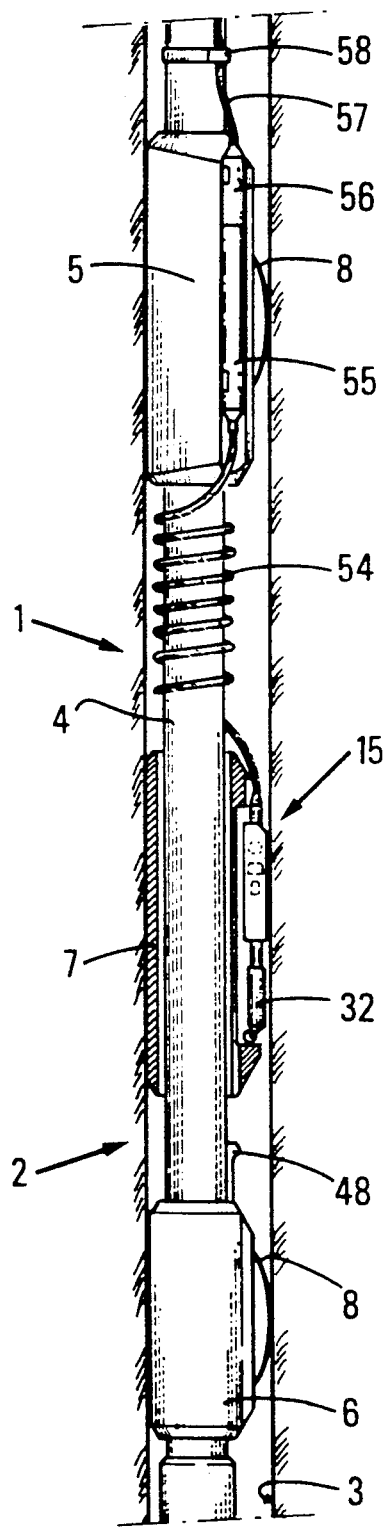
FIG. 1 is a schematic view of a probe in the anchoring position in a tubed well.

The probe shown in FIG. 1 may, for example, be used for carrying out measurements in a well equipped for petroleum production, with a casing 3 being cemented in the well. The probe 1 is connected to a rigid member or column 4 by a production tubular column or tubing.

Figure 6:
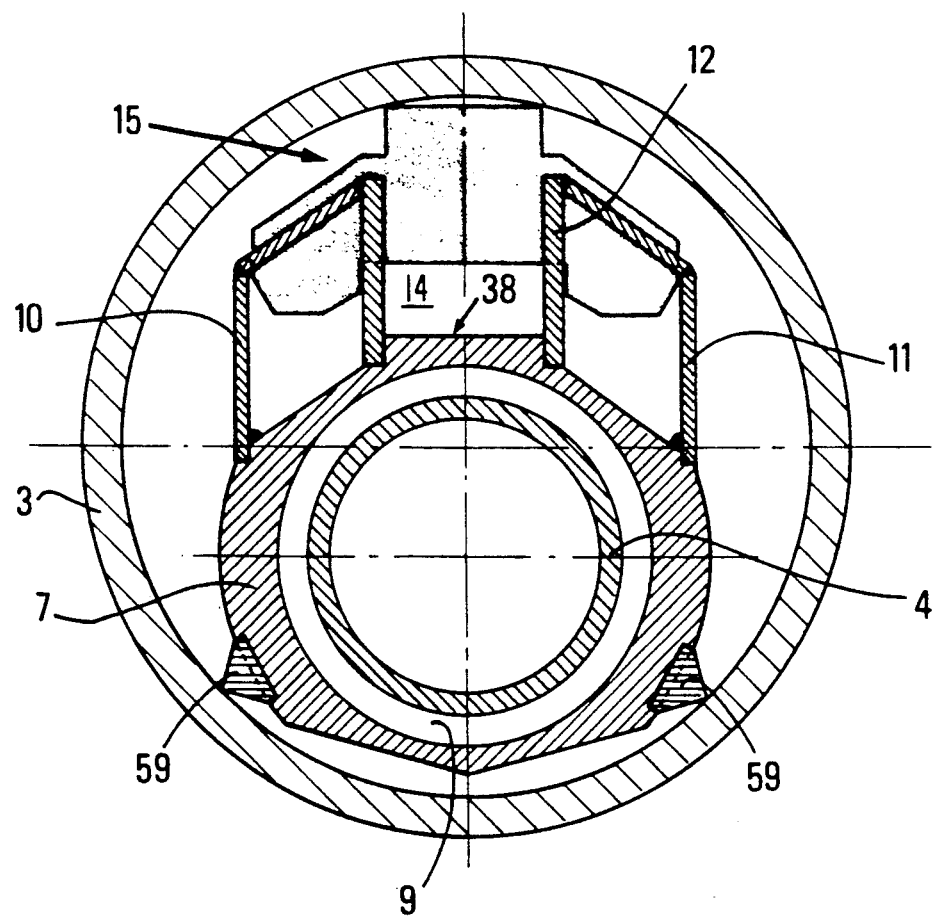
FIG. 6 is a transverse sectional view of the probe in the well.

The probe well comprises two offset shoes 5, 6 and one intermediate shoe 7. The offset shoes 5 and 6 are fixed around the column 4 at a certain distance from each other and are both provided with spring blades 8 disposed identically so as to urge the shoes 5, 6 against the wall of the casing 3 along a given radial plane. Similarly, the intermediate shoe 7 surrounds the column 4, with the intermediate shoe 7 being provided with a central passage 9 (FIG. 6) having a larger cross-section than a cross-section of the column 4. Longitudinal members 10, 11 disposed parallel to the axis of the column 4, each provided with an inner flange 12, (FIG. 2) and a lower stop 13 (FIG. 3) mounted on the intermediate shoe delimits a housing 14 for a mobile harness 15 having two portions 16, 17. The first portion 16 comprises a cylindrical casing 18 for the sensor means. The sensor means comprise, for example, three directional geophones 19, 20, 21 oriented along three orthogonal directions, with one of the geophones being, for example, parallel to the axis of the well. The cylindrical casing 18 is ended by a supporting plate 22. The casing 18 is nested inside an extended guide or measuring casing 23 on the side of a first extremity of the guide or measuring casing 23. This nesting is rendered impervious by sealing joints 24. A back end 25 is inserted on the side of the extremity opposite the guide or measuring casing 23, with the back end 25 being provided with gaskets 26 and an electromagnetic valve 27. The electromagnetic valve 27 comprises a rod 28 adapted to be moved between an opening position placing a first pipe 29 in communication with a second pipe 30, and a closing position blocking the passage between the two pipes. The first pipe opens at one end into an internal chamber 31 of the hydraulic jack 32, with the chamber 31 being delimited between one back end 33 of the body of the jack 32 forming a piston and a cavity 34 inside the second portion 17 of the mobile harness 15. Gaskets 35, 36 isolate the chamber 34 from the external environment. The second portion is also provided with a support plate 37, with the second pipe 30 opening outside the intermediate shoe 7.

Figure 4:
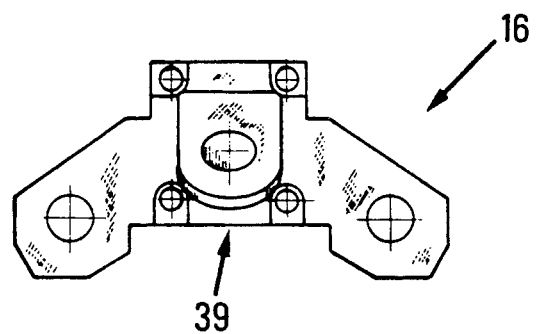
FIG. 4 is a top view of the mobile harness.

The intermediate shoe is provided with a boss 38 (FIG. 6) used to support the longitudinal groove 39 inside the mobile harness 15 (FIG. 4). Two springs 40, 41 disposed on both sides of the mobile harness 15, come to rest on the back end supporting plates 22 and 37 of the harness 15. The springs 40, 41 tend to spread apart the two portions 16, 17 of the mobile harness 15.

The lower portion of each inner flange 12 is provided with a rounded aperture 42 from which the hinge pin 43 of a small wheel 44 moves. By this small wheel 44, the mobile harness 15 rests on the upper surface 45 of the lower stop 13 which delimits the housing 14 at its base. This surface 45 is slightly inclined so that the back spring of the two springs 40, 41 tends to move the small wheel 44 and the mobile harness 15 in a direction toward the outside the housing 14. This orientates the aperture 42 in such a way that traction on the linking member from the surface creates a component force which brings the hinge pin 43 of the small wheel 44 back inside the housing 14.

The lower portion of the mobile harness 15 comprises a radial extension 46 on the internal side of the housing 14 and the plate 45 comprises a sectional axial recess 47 adapted to that of a hasp 48 integral with the lower offset shoe 6. This hasp 48 is provided with a flange 49. The radial extension 46 is adapted to be engaged under the flange 49 in a retracted position of the mobile harness 15 and thus to block the hasp 48. In this position, the intermediate shoe 7 is kept in position with respect to the lower offset shoe 6.

The guide or measuring casing 23 comprises a radial extension 50 on an internal side of the housing 14 and a finger 52 integral therewith. The finger 52 is engaged in a guiding aperture 51 arranged in the upper portion of the inner flanges 12.

The aperture 51 is oriented in such a way that the first portion of the mobile harness 15 is lowered to its retracted position in the housing 14. The form of the guiding aperture 51 is selected so that any traction exerted on the column 4 from the surface tends to make the second portion 17 of the mobile harness 15 move back towards the retracted position of the harness 15.

Engaging of the this hasp 49 in the intermediate shoe 7 (FIG. 5) makes it possible to impose a defined angular orientation on this shoe 7. The zone for applying the guide or measuring casing 23 against the wall is, for example, on the same side of the well as the zones for applying the springs 8.

The passage section 9 at the center of the intermediate shoe 7 is selected so that the shoe 7 does not touch the column 4 when the mobile harness 15 is in the position for coupling with the wall of the casing 3.

The electric conductor (not shown) associated with the various sensors 19-21 in the measuring casing 23, as well as those used for remote-controlling the electromagnetic valve 28, are connected by an impervious electric connector 53 and one multi-conductive cable portion 54 to an electronic cartridge 55 (FIG. 1) fixed to the upper offset shoe 5. By another electric connector 56, the electronic cartridge 55 is connected to another multi-conductive cable 57. The multi-conductive cable 57 is secured outside and all along the tubular column 4 by collars 58. By this cable 57, the electronic cartridge 55 is connected to a recording and control laboratory (not shown) provided outside the well. The electronic cartridge 55 contains, for example, means for preamplifying and filtering the signals produced by the sensors, as well as means for transmitting the signals on the cable. The electronic means in the cartridge may be, for example, the type described in French Patents 2,613,496 and 2,616,230 or respectively corresponding U.S. Pat. Nos. 4,862,425 and 4,901,289.

Pions, 59 are radially screwed into the body of the intermediate shoe 7. By varying their penetration, it is possible to center the intermediate shoe 7 so as to prevent the intermediate shoe 7 from touching the column 4 when it is in an anchoring position.

The well probe of the invention is installed in the following way.

Before lowering the casing-support of the intermediate shoe 7 into the well, the two offset shoes 5 and 6 are fixed to the column 4 so that, once the column 4 is placed in the production zone, the intermediate shoe 7 is positioned at a selected operational depth. The intermediate shoe 7 is placed between the two offset shoes 5 and 6 and it is positioned so that the hasp 48 is engaged in the groove 47. The electromagnetic valve 27 is then opened and hydraulic fluids are injected via the pipes 29 and 30 into the chamber 31 of the jack 32 so that the two portions 16 and 17 of the mobile harness 15 are drawn closer to each other and the springs 40 and 41 are compressed. In going back, the radial extension 46 blocks the hasp 48 in position. The valve 28 is then shut. The cable portion is connected between the cartridge 55 and the connector on the mobile harness 15. To avoid any risk of mechanical coupling, the cable portion 54 is fully loosened by winding it, for example, several times around the column 4 as shown in FIG. 1.

The column 4 is constructed by successively interconnecting tubing string. The cable 47 is gradually attached to the column 4 by collars 58.

Once the column 4 is in place and centered with respect to the casing 3 via the springs 8 and the cable is connected to the recording and control laboratory, the electromagnetic valve 28 is opened and the hydraulic fluid of the chamber 31 of the jack 32 escapes outside via the pipes 30 and 31, which enables the springs 40 and 41 to recoil and the mobile harness 15 to move toward its coupling position in strict contact with the wall of the casing 3. The displacement of the mobile harness 15 allows the extension 46 to move forward. The hasp 48 is therefore freed and can be disengaged from the groove 47. The column 4 is slightly driven so as to space the lower offset shoes 6 from the intermediate shoe 7 which has just been coupled with the wall. The intermediate shoe 7 is thus fully uncoupled from the remaining portion of the probe and, consequently, from the entire rigid column 4. The parastic vibrations which intermediate shoe, could pick up through the rigid column are not transmitted to the various sensors in the casing. The springs 40 and 41 are sufficient so as to obtain an extremely strict coupling of the guide or measuring casing 23 with the wall of the casing 3 since the weight to be anchored is reduced to that of the mobile harness 15 due to virtually all of the mechanical coupling being obtained.

It is possible to remain within the scope of the invention by associating several intermediate shoes with two offset shoes, such as, the shoes 5, 6 or even by disposing several sets of two offset shoes each on both sides of the measuring casing-support intermediate shoe so as to have measuring means at several different depths.

It is also possible within the scope of the invention to replace the blade springs 8 used for offsetting the shoes 5 and 6 by any equivalent device or by using offset shoes capable of being dilated mechanically or hydraulically.

Similarly, it is possible within the scope of the invention to keep in place the intermediate shoe 7 with respect to one of the offset shoes 5 and 6 by springs or any other movable linking device.

Similarly, the same applies by linking the jack 32 to means for providing a hydraulic fluid so as to be able, by a new engaging of the hasp 48 in its housing and by moving back the mobile harness 15 to its retracted position by injecting fluid into the jack, to move the probe towards another anchoring position. These means may, for example, be a hydraulic accumulator arranged, for example, in one of the offset shoes 5, 6 and connected to a conventional hydraulic circuit and valve means to the internal chamber 31.

What is claimed is:

1. A well probe adapted to be mechanical uncoupled from a rigid linking member connecting the well probe to a surface installation, the well probe comprising:
    at least two offset shoes fixed around the rigid linking member at a distance from each other;
    a mobile harness including at least one intermediate shoe disposed around the rigid linking member between the offset shoes, said intermediate shoe including a central passage having a cross-section larger than a cross-section of the rigid linking member, and at least one measuring casing associated with the intermediate shoe;
    means for laterally retractably displacing said measuring casing with respect to said intermediate shoe and said rigid linking member to couple and uncouple the measuring casing with a portion of a well; and
    conductive means for connecting the measuring casing to a recording unit,
    wherein said two offset shoes are arranged in such a manner so that, in an anchoring position in the well, the rigid linking member is centered in said central passage of the intermediate shoe so as to suppress any direct contact between the intermediate shoe and the rigid linking member.

2. A well probe according to claim 1, wherein said intermediate shoe includes a lateral cavity, said at least one measuring casing is integral with the mobile harness adapted to be moved into the lateral cavity of the intermediate shoe between one retracted position and one advanced position the mobile harness comprising two portions adapted to be moved with respect to each other in a longitudinal direction and fitted in such a manner so that spacing of the two portions in the longitudinal direction enables the mobile harness to move towards said advanced position, spring means are provided for longitudinally spacing the two portions of the mobile harness and wherein releasable means are provided for blocking the spring means in the retracted position of the mobile harness.

3. Well probe according to claim 2, wherein the lateral cavity of the intermediate shoe includes at least one sloped surface, the first portion of the mobile harness comprising an oblique aperture to guide a hinge pin fixed to the intermediate shoe, and the second portion of said mobile harness is fitted with a small wheel resting on said at least one slope surface of the lateral cavity of the intermediate shoe.

4. A well probe according to one of claims 2 or 3, wherein the releasable blocking means comprise a hydraulic jack including a piston integral with the first portion of the mobile harness and adapted to be moved into a chamber provided in the second portion of the mobile harness, and means for controlling a supply of a hydraulic fluid into said chamber so as to compress said spring means.

5. A well probe according to claim 4, wherein the means for controlling the injection comprise electromagnetic valve means for intermittently communicating said chamber with the well.

6. A well probe according to claim 5, wherein the means for controlling a supply of the hydraulic fluid comprise an accumulator associated with the probe and containing pressurized fluid.

7. A well probe according to claim 3, wherein the oblique aperture for the hinge pin of the intermediate shoe is oriented so that tractions exerted by the rigid linking member moves the mobile harness towards the retracted position.

8. A well probe according to claim 2, wherein said means for retracting comprises a rigid part fixed to one of said offset shoes, and wherein means are provided for blocking said rigid part in the intermediate shoe in a rearward movement position of the mobile harness.

9. A well probe according to claim 2, wherein the lateral cavity is delimited by plates disposed longitudinally so as to guide the displacement of the two portions of the mobile harness.

10. A well probe according to claim 1, wherein said at least one measuring casing comprises at least one housing for a directional acoustic or seismic sensor.

11. A well probe according to claim 10, wherein said sensor is a triaxial sensor.

12. Well probe according to claim 1, wherein the rigid linking member is a tubular column, the conductive means being fixed by collars disposed outside this column.

13. A well probe according to one of claims 1, 2 or 3, further comprising an electronic cartridge, and wherein the conductive means comprise a cable element for connecting said at least one measuring casing to the electronic cartridge, and a multi-conductive cable means for conducting said cartridge to a recording unit.

* * * * *